(12) United States Patent
Hirai et al.

(10) Patent No.: US 11,117,184 B2
(45) Date of Patent: Sep. 14, 2021

(54) AIRCRAFT PANEL PRODUCTION METHOD AND AIRCRAFT PANEL PRODUCTION SYSTEM

(71) Applicant: MITSUBISHI HEAVY INDUSTRIES, LTD., Tokyo (JP)

(72) Inventors: Makoto Hirai, Tokyo (JP); Hiroshi Taneda, Tokyo (JP); Takuya Goto, Tokyo (JP); Tsuyoshi Kaneko, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 414 days.

(21) Appl. No.: 16/073,138

(22) PCT Filed: Nov. 17, 2016

(86) PCT No.: PCT/JP2016/084073
§ 371 (c)(1),
(2) Date: Jul. 26, 2018

(87) PCT Pub. No.: WO2017/134899
PCT Pub. Date: Aug. 10, 2017

(65) Prior Publication Data
US 2019/0030588 A1    Jan. 31, 2019

(30) Foreign Application Priority Data
Feb. 2, 2016   (JP) .............................. JP2016-018428

(51) Int. Cl.
*B64C 1/12*     (2006.01)
*B64F 5/10*     (2017.01)
(Continued)

(52) U.S. Cl.
CPC ............. *B21J 15/142* (2013.01); *B21J 15/42* (2013.01); *B64C 1/12* (2013.01); *B64F 5/10* (2017.01); *B23P 2700/01* (2013.01)

(58) Field of Classification Search
CPC . B21J 15/142; B21J 15/42; B64F 5/10; B64C 1/12; B23P 2700/01;
(Continued)

(56) References Cited

U.S. PATENT DOCUMENTS 4,967,947 A * 11/1990 Sarh .................... B21J 15/14
227/156
5,033,178 A *  7/1991 Woods ................... B64F 5/10
29/281.1
(Continued)

FOREIGN PATENT DOCUMENTS

EP    0956915 A2    11/1999
EP    2883797 A1     6/2015
(Continued)

OTHER PUBLICATIONS

Extended European Search Report for European Application No. 16889382.4 dated Apr. 1, 2019; 10pp.
(Continued)

*Primary Examiner* — Sarang Afzali
*Assistant Examiner* — Darrell C Ford
(74) *Attorney, Agent, or Firm* — Kanesaka Berner and Partners LLP

(57) ABSTRACT

An aircraft panel production method has: a step in which a holding jig holds a body panel, which has a plurality of plate-like members having a curved cross-sectional shape, such that the cross section of the body panel has an upwardly bulging curved shape; a step in which the plate-like members of the body panel held by the holding jig are overlapped with each other and the overlapping portions are joined by (Continued)

a rivet; a step in which the holding jig, which is holding the body panel of which the plate-like members have been joined to each other, is moved; and a step in which a frame that follows the curved shape of the body panel is joined, by a rivet, to the plate-like members of the body panel which is held by the holding jig which has been moved.

11 Claims, 6 Drawing Sheets

(51) Int. Cl.
 *B21J 15/14* (2006.01)
 *B21J 15/42* (2006.01)
(58) Field of Classification Search
 CPC ......... Y10T 29/49895; Y10T 29/49899; Y10T 29/49902; Y10T 29/49828; Y10T 29/49829; Y10T 29/49943; Y10T 29/49947; Y10T 29/49954; Y10T 29/49956
 USPC ........ 29/524.1, 525.01, 525.05, 525.06, 464, 29/466, 468, 429, 430
 See application file for complete search history.

(56) References Cited

U.S. PATENT DOCUMENTS

| | | | | |
|---|---|---|---|---|
| 5,231,747 A * | 8/1993 | Clark | ............... | B21J 15/10 227/152 |
| 5,560,102 A * | 10/1996 | Micale | ............... | B64F 5/10 29/897.2 |
| 5,896,637 A * | 4/1999 | Sarh | ............... | B23P 19/04 227/51 |
| 6,121,781 A | 9/2000 | Martinez | | |
| 6,430,796 B1 * | 8/2002 | Jones | ............... | B21J 15/10 29/243.53 |
| 6,551,428 B1 * | 4/2003 | Guillou | ............... | B64F 5/10 156/91 |
| 9,090,357 B2 * | 7/2015 | Oberoi | ............... | B64C 1/18 |
| 10,919,746 B2 * | 2/2021 | Stone | ............... | B64F 5/00 |
| 2001/0054228 A1 * | 12/2001 | Lehmker | ............... | B21J 15/10 29/701 |
| 2002/0092149 A1 * | 7/2002 | Wolf | ............... | B21J 15/14 29/464 |
| 2004/0056498 A1 * | 3/2004 | Ghuman | ............... | B23P 21/004 296/1.01 |
| 2006/0108058 A1 * | 5/2006 | Chapman | ............... | B29D 99/0014 156/245 |
| 2011/0047791 A1 * | 3/2011 | Ferenczi | ............... | B23P 21/004 29/791 |
| 2012/0011693 A1 | 1/2012 | Amirehteshami et al. | | |
| 2013/0152397 A1 * | 6/2013 | Oberoi | ............... | B64F 5/50 29/897.2 |
| 2013/0241130 A1 * | 9/2013 | Ozu | ............... | B25B 11/02 269/45 |
| 2015/0083860 A1 * | 3/2015 | Frauen | ............... | B64C 1/26 244/119 |
| 2015/0266147 A1 * | 9/2015 | Reid | ............... | B23P 21/004 29/525.01 |
| 2020/0223020 A1 * | 7/2020 | Oberst | ............... | B64F 5/10 |

FOREIGN PATENT DOCUMENTS

| | | |
|---|---|---|
| JP | 2008-7114 A | 1/2008 |
| JP | 2013-124099 A | 6/2013 |
| JP | 2013-198918 A | 10/2013 |
| JP | 2015-30348 A | 2/2015 |
| JP | 2015-54324 A | 3/2015 |
| WO | 97/34733 A1 | 9/1997 |
| WO | 97/34734 A1 | 9/1997 |

OTHER PUBLICATIONS

"A story toward making a jumbo jet airliner Boeing "777" [in Gifu works/ Nagoya Works 1]Make a fuselage panel", Kawasaki News, Kawasaki Heavy Industries, Ltd., Publication Office, Apr. 2005, No. 138, pp. 1-7, 5pp.
International Search Report and Written Opinion for PCT/JP2016/084073, dated Feb. 7, 2017, 15 pp.

* cited by examiner

AIRCRAFT PANEL PRODUCTION METHOD AND AIRCRAFT PANEL PRODUCTION SYSTEM

RELATED APPLICATIONS

The present application is a National Phase of PCT/JP2016/084073, filed Nov. 17, 2016, and claims priority based on Japanese Patent Application No. 2016-018428, filed Feb. 2, 2016.

TECHNICAL FIELD

The present invention relates to an aircraft panel production method and an aircraft panel production system.

BACKGROUND ART

A body panel of an aircraft is configured with a combination of a plate-shaped skin having a curved surface, an elongated stringer which is provided on the skin along a longitudinal direction of a body, a frame which is provided along a circumferential direction of the body, and the like.

The joining of overlapping portions of the skins adjacent to each other or the joining of the frame to the skin or the stringer is performed after the position of each component is accurately determined by using a positioning jig. Rivets are used for the joining of the components. By using a positioning jig with high rigidity, it is possible to join each component at an accurate position with respect to the skin with low rigidity.

In the related art, the positioning jig is fixed and used at a predetermined position in a factory, and the joining of the skins described above or the joining of the frame is performed at a predetermined position to manufacture a body panel. In a case where the body panel which is being manufactured is moved from a work place of one process to a work place of the next process, the body panel is moved with it removed from the positioning jig, and the positioning jig itself does not move.

CITATION LIST

Non Patent Literature

[NPL 1] "Until a large-sized jet airliner Boeing "777" is made . . . (1) Making a body panel [edited by Gifu factory: Nagoya Daiichi Factory]", Kawasaki News, Kawasaki Heavy Industries, Ltd. Public Relations Office, No. 138, p.1-7, April 2005

SUMMARY OF INVENTION

Technical Problem

The positioning jig which is fixed and used at a predetermined position is manufactured in advance according to the shape of a body panel which is manufactured. In the body panel, there is not only a case where it has a single curved surface in which a longitudinal direction is a straight line, but also a case where it has a double-curved surface having curvature in the longitudinal direction as well. For this reason, it is necessary to manufacture many kinds of positioning jigs according to the shapes of the body panels, and thus the cost of the manufacturing or management of the jig is also increased.

When rivet fastening work is performed in the manufacturing process of the body panel, the joining of overlapping portions of the skins adjacent to each other or the joining of the frame to the skin or the stringer is performed by riveting by manual work. In recent years, an automatic riveting machine has also been adopted for these processes. However, when performing riveting on a panel fixed to the positioning jig, there is a case where the automatic riveting machine interferes with a support member of the positioning jig, which supports the panel, and therefore, there is a limit to the range in which the automatic riveting machine can be applied.

Further, when the body panel is moved from the work place of one process to the work place of the next process, it is necessary to remove the body panel from the positioning jig which is located at the work place of one process and mount the body panel on the positioning jig which is located at the work place of the next process, and thus work associated with inter-process movement is required. Further, in the positioning jig of the related art, a large number of positioning materials are disposed corresponding to the frame intervals of the body panel, and therefore, the range in which the automatic riveting machine can be applied is limited. For this reason, the ratio of the number of rivets which can be fastened by using the automatic riveting machine is small compared to the total number of rivets.

The present invention has been made in view of such circumstances and has an object to provide an aircraft panel production method and an aircraft panel production system in which it is possible to simplify the manufacturing or management of a jig and suppress the cost of the manufacturing or management of the jig.

Solution to Problem

According to a first aspect of the present invention, there is provided an aircraft panel production method including: a step in which a holding jig holds an aircraft panel having a plurality of plate-like members each having a curved cross-sectional shape such that a cross section of the aircraft panel has an upwardly convexly curved shape; a step of overlapping the plurality of plate-like members of the aircraft panel held by the holding jig and joining overlapping portions together by rivets; a step of moving the holding jig holding the aircraft panel with the plurality of plate-like members joined together; and a step of joining, by rivets, a curved member which follows the curved shape of the aircraft panel to the plurality of plate-like members of the aircraft panel held by the holding jig which has been moved.

According to this configuration, the plurality of plate-like members constituting the aircraft panel are fastened to each other by rivets at the overlapping portions and then moved to a different place, and the curved member is mounted on the plate-like member of the aircraft panel by rivets.

In the first aspect, a state where the aircraft panel is held by the holding jig is maintained through the step of joining the overlapping portions of the plurality of plate-like members together by rivets, the step of moving the holding jig with the aircraft panel held thereon, and the step of joining the curved member by rivets.

According to this configuration, since the holding jig is moved through each process while maintaining a state where the aircraft panel is held by the holding jig, it is possible to omit work of removing the aircraft panel from a positioning jig or work of mounting the aircraft panel on the positioning jig.

In the first aspect, in the step in which the holding jig holds the aircraft panel, the holding jig has a plurality of grip parts and the plurality of grip parts may hold only peripheral edge portions of the plurality of plate-like members to hold the aircraft panel.

According to this configuration, since it is possible to omit a structural member for supporting the central portion of the plate-like member in the structure of the holding jig while appropriately maintaining the shape of the peripheral edge portion requiring accuracy in assembly, it is possible to reduce the weight of the holding jig. In this way, it is possible to reduce the power associated with the movement of the holding jig. Further, the structural member for supporting the central portion of the plate-like member is omitted in the structure of the holding jig, whereby it is possible to reduce the interference between the automatic riveting machine and the holding jig and expand the range in which the automatic riveting machine can be applied.

In the first aspect, the holding jig has a plurality of grip parts which grip end portions of two facing sides of the aircraft panel, and the plurality of grip parts may grip peripheral edge portions of the plurality of plate-like members to hold the aircraft panel. In the first aspect, the two facing sides are two sides extending in a direction perpendicular to a cross section having an upwardly convexly curved shape of the aircraft panel, and become lower peripheral edge portions of the aircraft panel in a state of being held by the holding jig.

According to this configuration, since the aircraft panel having an upwardly convexly curved shape is gripped and supported at the lower peripheral edge portions, it is possible to stably hold an aircraft panel with low rigidity. In this way, it is possible to omit a structural member for supporting the central portion of the plate-like member in the structure of the holding jig while appropriately maintaining the shape of the peripheral edge portion requiring accuracy in assembly.

In the first aspect, in at least one of the step of joining the overlapping portions of the plurality of plate-like members together by rivets and the step of joining the curved member by rivets, the joining by the rivets is performed by an automatic riveting machine.

According to this configuration, since it is possible to manufacture an aircraft panel with high accuracy according to the order described above, it is possible to achieve labor-saving of work due to fastening using an automatic riveting machine instead of manual rivet fastening.

In the first aspect, the aircraft panel production method further includes a step of fixing the holding jig in a buffer space, after at least one of the step of joining the overlapping portions of the plurality of plate-like members together by rivets and the step of joining the curved member by rivets, in which in the buffer space, the automatic riveting machine performs the joining by the rivets.

According to this configuration, after the rivet fastening work by the automatic riveting machine, the buffer space is provided and the holding jig is fixed there, and in some cases, the automatic riveting machine performs the joining by rivets, and therefore, it is possible to absorb the time difference of work time, which occurs according to the kind of an aircraft panel.

In the first aspect, the holding jig moves in one direction along a track for transport, and in the step of joining the overlapping portions of the plurality of plate-like members together by rivets and the step of joining the curved member by rivets, the holding jig is fixed in each processing space.

According to this configuration, the track for transport is provided, and thus the holding jig moves in one direction along the track for transport, and in each work space, the holding jig is fixed and the rivet fastening work or the like is performed on the aircraft panel. That is, while work is being performed, the aircraft panel is fixed, and the aircraft panel moves only when being transported between the work spaces.

In the first aspect, the holding jig includes a plurality of grip parts which grip end portions of two facing sides of the aircraft panel, and a support material provided corresponding to the aircraft panel which is gripped by the plurality of grip parts, and integrally supporting the plurality of grip parts, the support material has a first frame material which is provided corresponding to each side of the two facing sides of the aircraft panel along a uniaxial direction, the plurality of grip parts supported by the first frame material hold the aircraft panel such that a cross section cut in a direction perpendicular to the uniaxial direction has an upwardly convexly curved shape, while gripping the aircraft panel at end portions of the two facing sides of the aircraft panel along the uniaxial direction, and the holding jig has a configuration capable of being transported in a state of holding the aircraft panel.

In the related art, with a jig having a complicated structure, a frame is mounted on a skin or a stringer while overlapping a plurality of skins adjacent to each other in one work space. However, it is a jig which holds both end portions of the plate-like member of the aircraft panel and holds the plate-like member such that the cross section of the plate-like member has an upwardly convexly curved shape, and therefore, in another subsequent process, another curved member (for example, a frame) can be mounted on the plate-like member (for example, a skin) or a stringer provided on the skin. Accordingly, it is possible to assemble the aircraft panel with a simple jig.

According to a second aspect of the present invention, there is provided an aircraft panel production method for manufacturing plural kinds of aircraft panels on the same line, the method including: a step of placing a plurality of plate-like members constituting the aircraft panel on a holding jig and gripping peripheral edge portions of the aircraft panel to fix the plate-like members onto the holding jig; a step of transporting the holding jig to a first processing area; a step of overlapping and temporarily fastening the plurality of plate-like members to each other to hold the plate-like members such that a cross section of the aircraft panel has an upwardly convexly curved shape, in the first processing area; a step of transporting the holding jig with the aircraft panel placed thereon from the first processing area to a second processing area; and a step of joining overlapping portions of the plurality of plate-like members together by rivets in the second processing area, in which in the step of fixing the plate-like members onto the holding jig, only peripheral edge portions in a longitudinal direction of the plurality of plate-like members are gripped and fixed, and the holding jig moves between the first processing area and the second processing area while maintaining a state of gripping the aircraft panel.

According to a third aspect of the present invention, there is provided an aircraft panel production method for manufacturing plural kinds of aircraft panels on the same line, the method including: a step of placing a plurality of plate-like members constituting the aircraft panel on a holding jig and gripping peripheral edge portions of the aircraft panel to fix the plate-like members onto the holding jig; a step of transporting the holding jig to a first processing area; a step of combining the holding jig with a shape retaining jig installed in the first processing area, in the first processing area; a step of performing adjustment of shapes of the plurality of plate-like members by the shape retaining jig; a step of overlapping and temporarily fastening the plurality of plate-like members to each other to hold the plate-like members such that a cross section of the aircraft panel has an upwardly convexly curved shape; a step of transporting the holding jig with the aircraft panel placed thereon from the first processing area to a second processing area; and a step of joining overlapping portions of the plurality of plate-like members together by rivets in the second processing area.

According to a fourth aspect of the present invention, there is provided an aircraft panel production method for manufacturing plural kinds of aircraft panels on the same line, the method including: a step of overlapping and temporarily fastening the plurality of plate-like members constituting the aircraft panel to each other to hold the plate-like members such that a cross section of the aircraft panel has an upwardly convexly curved shape, in a first processing area; a step of transporting the holding jig with the aircraft panel placed thereon from the first processing area to a second processing area; a step of joining overlapping portions of the plurality of plate-like members together by rivets in the second processing area; a step of transporting the holding jig with the aircraft panel placed thereon from the second processing area to a third processing area; and a step of mounting another member on the aircraft panel on the holding jig in the third processing area.

According to a fifth aspect of the present invention, there is provided an aircraft panel production method for manufacturing plural kinds of aircraft panels on the same line, the system including: a holding jig which moves between a first processing area and a second processing area while maintaining a state of gripping the aircraft panel; a shape retaining jig which is installed in the first processing area and used in combination with the holding jig; and a riveting device which is installed in the second processing area and fastens rivets to the aircraft panel on the holding jig, in which the holding jig includes a jig frame having a common portion common to the plural kinds of aircraft panels, a support material provided inside the jig frame, and a grip part which is provided at the support material and grips a peripheral edge portion in a longitudinal direction of the aircraft panel, and holds the aircraft panel by only the grip part such that a cross section of the aircraft panel has an upwardly convexly curved shape.

Advantageous Effects of Invention

According to the present invention, since the curved member is fixed to the plate-like member after the shape of the plate-like member of the aircraft panel is determined, it is possible to perform assembly with a simple jig, and it is possible to simplify the manufacturing or management of the jig and reduce the cost of the manufacturing or management of the jig. Further, with regard to the rivet fastening work, it is possible to increase the range in which the automatic riveting machine can be applied.

DESCRIPTION OF EMBODIMENTS

Figure 1:
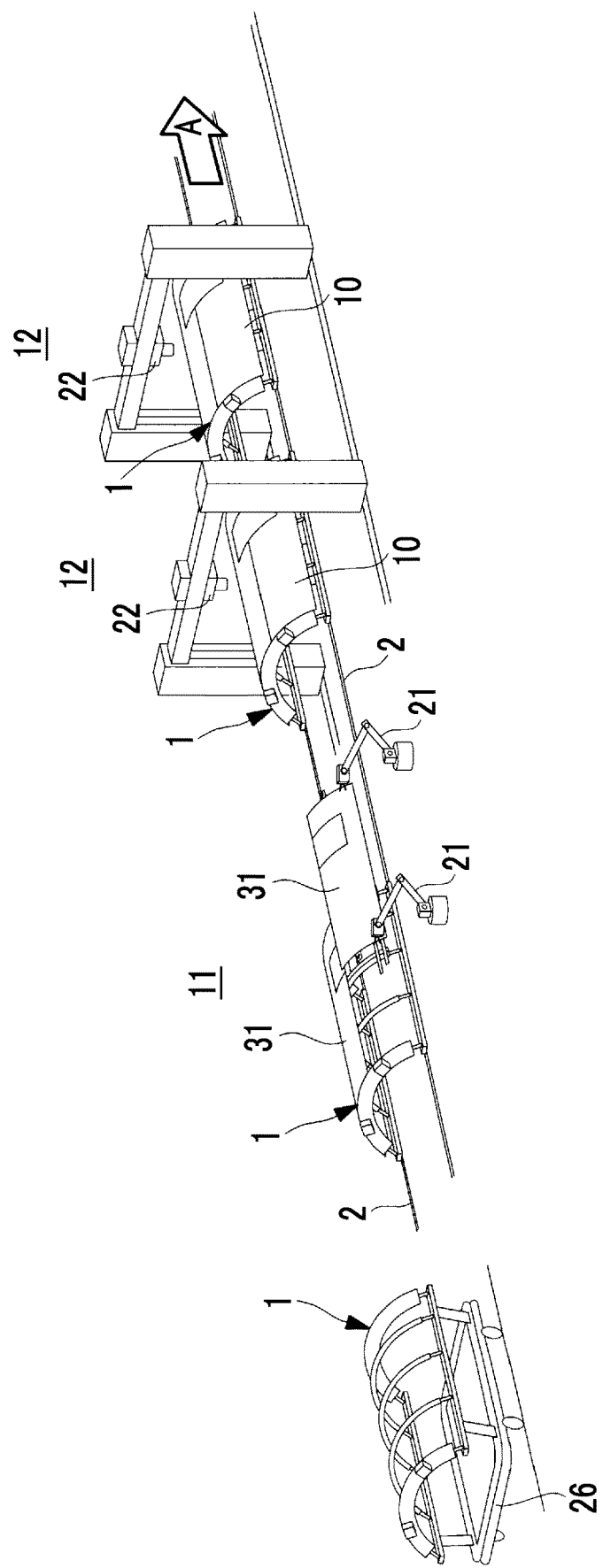
FIG. 1 is a perspective view showing a body panel production system according to an embodiment of the present invention.
Figure 2:
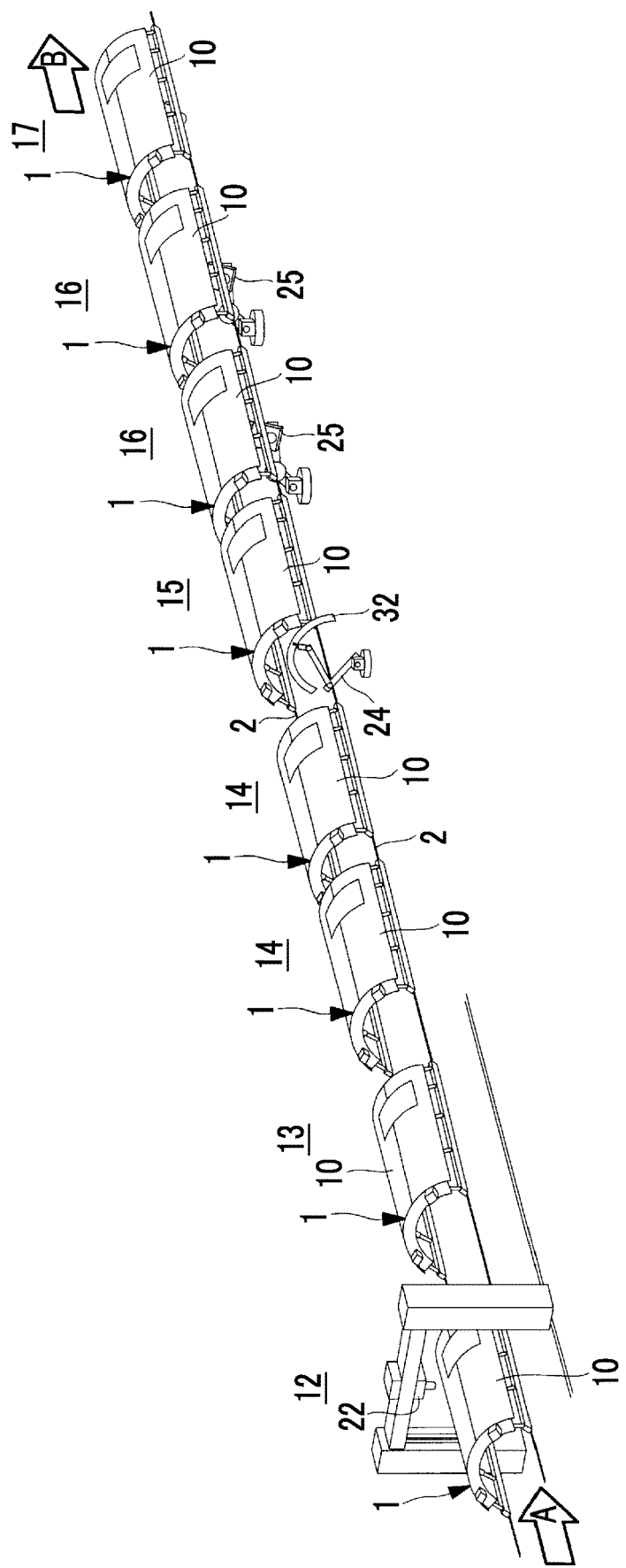
FIG. 2 is a perspective view showing the body panel production system according to the embodiment of the present invention.
Figure 3:
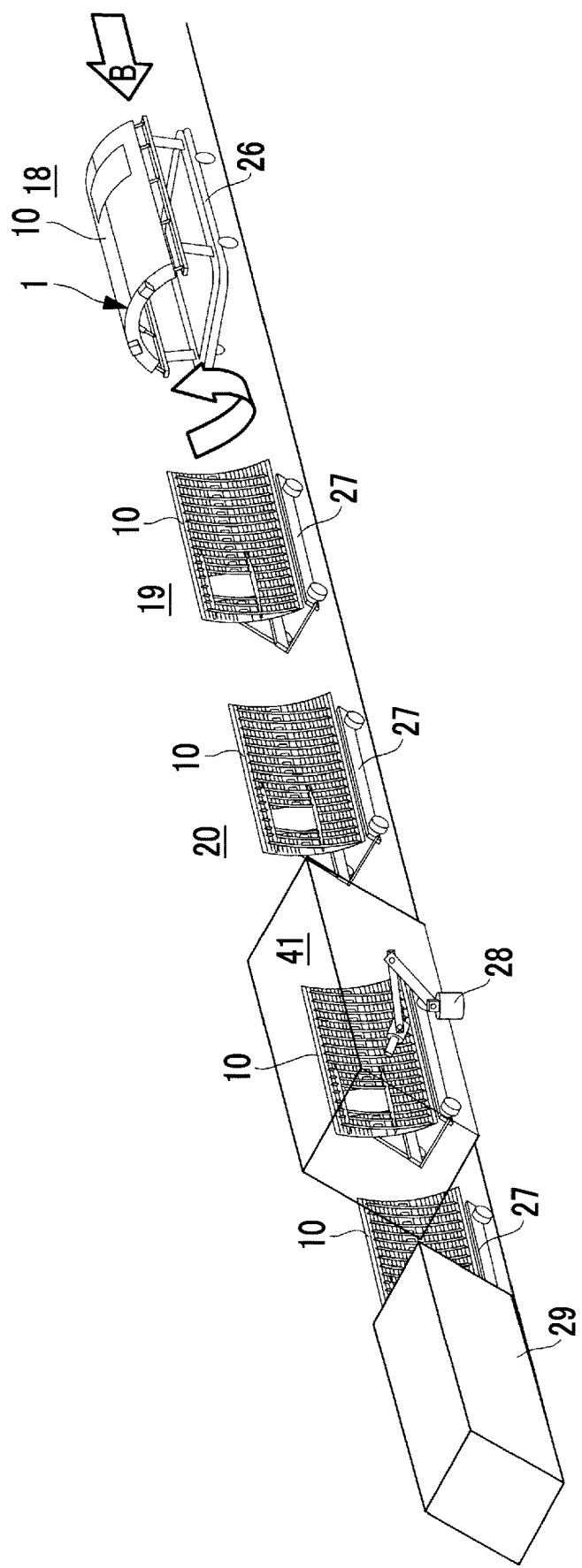
FIG. 3 is a perspective view showing the body panel production system according to the embodiment of the present invention.

Hereinafter, an embodiment of the present invention will be described with reference to the drawings. FIGS. 1 to 3 are perspective views showing a body panel production system according to an embodiment of the present invention. In FIGS. 1 and 2, an arrow A indicates that a track for transport 2 is continuous, and in FIGS. 2 and 3, an arrow B indicates that a transporting method is changed.

First, the body panel production system according to the embodiment of the present invention will be described.

As shown in FIGS. 1 and 2, the body panel production system includes a holding jig 1 which holds a body panel 10, and the track for transport 2 along which the holding jig 1 is transported. In this embodiment, the track for transport 2 is formed in one direction so as to pass through a plurality of work spaces.

The body panel 10 has a shape obtained by dividing a substantially cylindrical body portion of an aircraft in an axis direction and a circumferential direction. Therefore, in the body panel 10, a cross section in the direction perpendicular to the axis direction has an arc shape. In the body panel 10, two facing sides parallel or oblique to the axis direction are straight lines and are located at lower ends of the body panel 10 when the body panel 10 is held by the holding jig 1. Further, in the body panel 10, two facing sides, each of which falls within a plane perpendicular to the axis direction, have arc shapes and are located at side ends of the body panel 10 when the body panel 10 is held by the holding jig 1.

In the track for transport 2, a transport device such as a chain conveyor or a belt conveyor, for example, is provided. The holding jig 1 is placed on the transport device and transported from one end side of the track for transport 2 to the other end side. In the transport device, a chain, a belt, or the like is driven by a motor, and the chain, the belt or the like is provided to be wound parallel to a horizontal material 6 of the holding jig 1.

The holding jig 1 is made of, for example, aluminum or an aluminum alloy. When the body panel 10 is held by the holding jig 1, the body panel 10 is held so as to be convex upward. The holding jig 1 shown in the drawings is merely an example, and the holding jig which is used in the present invention is not limited to the holding jig having this configuration.

The track for transport 2 is provided such that the holding jig 1 passes through a split panel mounting space 11, an automatic riveting space 12 for skin overlapping, a buffer space 13, a manual riveting space 14, a frame mounting space 15 for mounting a frame 32, and an automatic riveting space 16 for joining the frame 32 to a skin or a stringer, in order. The split panel mounting space 11, the automatic riveting space 12, the buffer space 13, the manual riveting space 14, the frame mounting space 15, and the automatic riveting space 16 will be described later.

Further, in this embodiment, a split panel mounting robot 21 is installed in the split panel mounting space 11, and a gate type automatic riveting machine 22 provided with a gate type frame is installed in the automatic riveting space 12 for skin overlapping. Further, a frame mounting robot 24 is installed in the frame mounting space 15, and an automatic riveting machine 25 is installed in the automatic riveting space 16 for joining the frame 32 to a skin or a stringer.

Further, a plurality of, for example, three gate type automatic riveting machines 22 are installed in the automatic riveting space 12 for skin overlapping, and a plurality of, for example, two automatic riveting machines 25 are installed in the automatic riveting space 16 for joining the frame 32 to a skin or a stringer.

Next, a method of manufacturing the body panel 10 using the body panel production system described above will be described.

First, the holding jig 1 placed on a bogie 26 is moved to the track for transport 2 and the holding jig 1 is transferred to the track for transport 2.

Next, the holding jig 1 is moved to the split panel mounting space 11, and the body panel 10 is held by the holding jig 1. After the holding jig 1 is fixed at a predetermined position of the split panel mounting space 11, mounting work is started. In a case where the body panel 10 is held by the holding jig 1, first, a split panel 31 is placed at a predetermined position of the holding jig 1 by the split panel mounting robot 21 or the like. The split panel 31 is a member before the body panel 10 is fastened by rivets, and is a member which is one among a plurality of parts into which the body panel is divided. The split panel 31 is, for example, a member which is long in the direction parallel to the axis direction and is one among a plurality of parts into which the body panel 10 is divided in the circumferential direction. The split panel 31 is one among three parts into which the body panel 10 is divided in the circumferential direction, for example.

The split panel 31 of the body panel 10 is fixed by a grip part 3 provided in the holding jig 1. At this time, in order to retain the shape of the split panel 31, the body panel 10 is held from the lower side by using an initial shape retaining jig 51 (refer to FIG. 6) other than the holding jig 1. Further, in a case where an opening portion is formed in the body panel 10 at a position or the like corresponding to a door of an aircraft, an opening portion reinforcing material (not shown) is provided along an edge portion of the opening portion. In this case, a jig which holds the opening portion reinforcing material may be provided in the initial shape retaining jig 51 described above. The initial shape retaining jig 51 is fixed in the split panel mounting space 11.

When the plurality of split panels 31 are placed on the holding jig 1, the skins of the split panels 31 adjacent to each other on the holding jig 1 are overlapped each other in the vicinity of the end portions. That is, the skin of the other split panel 31 is placed on the skin of one split panel 31. Then, the overlapping portions of the skins are temporarily fastened to each other by rivets. Then, the temporarily fastened body panel 10 is maintained in a state of being fixed by the grip part 3 provided in the holding jig 1.

The body panel 10 temporarily fastened and fixed by the grip part 3 is moved to the automatic riveting space 12 which is the next process in a state of being installed on the holding jig 1. The movement of the holding jig 1 is performed by, for example, a conveyor which is located at a bottom portion of the holding jig 1. When the holding jig 1 is moved, the initial shape retaining jig 51 is removed from the body panel 10. Even in this state, the holding jig 1 fixes the body panel 10 such that the shape of the completed body panel 10 is retained.

Next, the holding jig 1 is moved to the automatic riveting space 12, and the skins of the split panels 31 adjacent to each other, which are placed on the holding jig 1, are fastened to each other by rivets. After the holding jig 1 is fixed at a predetermined position of the automatic riveting space 12, riveting work is started. The gate type automatic riveting machine 22 for joining the overlapping portions of the skins adjacent to each other together is installed so as to straddle the holding jig 1, and the gate type automatic riveting machine 22 performs riveting toward the lower side from the upper side of the split panel 31 placed on the holding jig 1.

The gate type automatic riveting machine 22 can perform riveting in a radial direction of the body panel 10. The gate type automatic riveting machine 22 continuously fastens the rivets. In this way, the riveting is performed in the radial direction of the body panel 10, and the split panels 31 adjacent to each other are joined together at the overlapping portions.

Further, the gate type automatic riveting machine 22 is movable in the axis direction of the holding jig 1 and the body panel 10, that is, parallel to the track for transport 2, and the gate type automatic riveting machine 22 moves along the axis direction of the holding jig 1 and the body panel 10 which are fixed. Therefore, the gate type automatic riveting machine 22 moves while the holding jig 1 is fixed, whereby it is possible to perform the riveting of the overlapping portions of the other area after the riveting of the overlapping portions of one area is completed.

The body panel 10 on which the riveting has been completed is moved to the next automatic riveting space 12 in a state of being installed on the holding jig 1. The movement of the holding jig 1 is performed by, for example, the conveyor which is located at the bottom portion of the holding jig 1.

The automatic riveting spaces 12 are provided at, for example, three locations, and one gate type automatic riveting machine 22 is provided for each of the automatic riveting spaces 12, so that a total of three gate type automatic riveting machines 22 are installed. Further, at least one buffer space 13 is provided on the downstream side of the automatic riveting space 12. One body panel can be installed in each of the three automatic riveting spaces 12 and one buffer space 13. The gate type automatic riveting machine 22 can also be moved to the buffer space 13, and in the buffer space 13, rivet fastening work by the gate type automatic riveting machine 22 can also be performed on the body panel 10. Further, different types of rivets are used in the riveting by the three gate type automatic riveting machines 22, and thus, compared to a case of replacing the type of a rivet in a single gate type automatic riveting machine 22, it is possible to omit the labor of replacement work.

After the automatic riveting is completed in the automatic riveting space 12, the holding jig 1 is moved to the buffer space 13, and the holding jig 1 with the body panel 10 installed thereon may be temporarily fixed until riveting by a worker is performed in the manual riveting space 14. The buffer space 13 is provided, whereby it is possible to absorb the time difference of work time in each of the automatic riveting space 12, the manual riveting space 14, and the like and to reduce a space in which work is not performed in the production line due to waiting.

Next, the holding jig 1 is moved to the manual riveting space 14, and rivet fastening work of the portion which is hard to be riveted in the gate type automatic riveting machine 22 and the automatic riveting machine 25 is performed. After the holding jig 1 is fixed at a predetermined position of the manual riveting space 14, the riveting work by a worker is started.

Manual rivet fastening work is performed on, for example, hinge mounting of an aircraft door which is mounted on the body panel 10, mounting of a bracket for wiring and piping or a bracket for sensor installation, or the like.

The manual riveting spaces 14 are provided at two locations, for example. That is, after the work is completed in one manual riveting space 14, the holding jig is moved to the next manual riveting space 14. The plurality of manual riveting spaces 14 are provided, whereby it is also possible to complete the work on the body panel 10 in which a work rate of manual rivet fastening work is large, so that it cannot be dealt with by only one manual riveting space 14.

The body panel 10 on which the riveting in the manual riveting space 14 is completed is moved to the next frame mounting space 15 in a state of being installed on the holding jig 1. The movement of the holding jig 1 is performed by, for example, the conveyor which is located at the bottom portion of the holding jig 1, similar to the previous process.

In the frame mounting space 15, the frame 32 is mounted on the skin or the stringer. After the holding jig 1 is fixed at a predetermined position of the automatic riveting space 16, the riveting work is started. The mounting of the frame 32 on the skin or the stringer is performed by, for example, the frame mounting robot 24. The frame mounting robot 24 is disposed so as to be located below the body panel 10 placed on the holding jig 1. The frame mounting robot 24 grips the frame 32 to be mounted and transports the frame 32 to a predetermined position in the skin or the stringer. The transported frame 32 is temporarily fastened by rivets at the predetermined position in the skin or the stringer.

The body panel 10 with the frame 32 temporarily fastened thereto is moved to the automatic riveting space 16 which is the next process in a state of being installed on the holding jig 1. The movement of the holding jig 1 is performed by, for example, the conveyor which is located at the bottom portion of the holding jig 1.

Next, the holding jig 1 is moved to the automatic riveting space 16, and the frame 32 is fastened to the skin or the stringer of the body panel 10 placed on the holding jig 1 by rivets. After the holding jig 1 is fixed at a predetermined position of the automatic riveting space 16, riveting work is started. The automatic riveting machine 25 for joining the skin or the stringer is disposed so as to be located below the body panel 10 placed on the holding jig 1. The automatic riveting machine 25 fastens rivets to, for example, the stringer of the body panel 10 placed on the holding jig 1 and the frame 32 temporarily fastened to the stringer, in the direction substantially perpendicular to the plate surface of the frame 32 (that is, the direction substantially parallel to the plate surface of the skin of the body panel).

The automatic riveting machine 25 moves to the riveting position while the holding jig 1 is fixed, whereby it is possible to perform riveting on a plurality of frames 32.

The body panel 10 on which the riveting has been completed is moved to the next automatic riveting space 16 in a state of being installed on the holding jig 1.

The automatic riveting spaces 16 are provided at, for example, two locations, and thus, for example, a total of two automatic riveting machines 25 are installed. The two automatic riveting machines 25 are installed, whereby it is possible to simultaneously perform riveting on the two body panels 10. Different types of rivets are used in the riveting by the two automatic riveting machines 25, and thus, compared to a case of replacing the type of a rivet in a single automatic riveting machine 25, it is possible to omit the labor of replacement work. Further, in a case where the riveting by the automatic riveting machine 25 is not performed in the automatic riveting space 16, after the automatic riveting machine 25 is moved to a buffer space 17, the rivet fastening work by the automatic riveting machine 25 can also be performed on the body panel 10 on which work has not been completed in the automatic riveting space 16.

After the automatic riveting is completed in the automatic riveting space 16, the holding jig 1 is moved to the buffer space 17 or the holding jig 1 is moved from the track for transport 2 to the bogie 26. In this way, the holding jig 1 is placed on the bogie 26 in a state where the body panel 10 is placed thereon, and the body panel 10 is movable together with the bogie 26.

Next, the body panel 10 placed on the holding jig 1 is moved to an inspection and repair space 18 by the bogie 26. In the inspection and repair space 18, an inspection of whether or not appropriate riveting has been carried out on the body panel 10 on which the riveting has been completed is performed, and in a case where repair is necessary, the rivet is removed by a worker and a rivet is fastened again.

The body panel 10 on which the inspection has been completed is lifted up and removed from the holding jig 1 by a crane or the like. The body panel 10 removed from the holding jig 1 is rotated by about 90° in the circumferential direction of the body panel 10 and directly placed on a bogie 27. The body panel 10 placed on the bogie 27 is moved to a manual work space 19 and various manual work, for example, mounting of a floor beam, cutting of a protruding portion of a door, mounting of a door hinge, and the like are performed. Thereafter, the body panel 10 is moved to a sanding and cleaning space 20, and in the sanding and cleaning space 20, sanding is performed as base treatment before painting is performed on the body panel 10, and surface treatment is carried out on the body panel 10.

Thereafter, the body panel 10 is moved to a painting space 41, and painting is carried out on the entire body panel 10 by, for example, a painting robot 28 or the like. The body panel 10 on which the painting has been completed is stored in, for example, a container 29 as a finished product and shipped.

As described above, a state where the body panel 10 is held by the holding jig 1 is maintained through the process of joining the overlapping portions of the skins of the plurality of split panels 31 together by rivets, the process of moving the holding jig 1 holding the body panel 10, and the process of joining the frames 32 by rivets. In this way, the holding jig 1 is moved through the respective processes while maintaining a state where the body panel 10 is held on the holding jig 1, and therefore, it becomes possible to omit work of removing the body panel 10 from a positioning jig or work of mounting the body panel 10 on the positioning jig.

Next, an example of the holding jig 1 which is used in the body panel production system according to this embodiment will be described.

Figure 4:
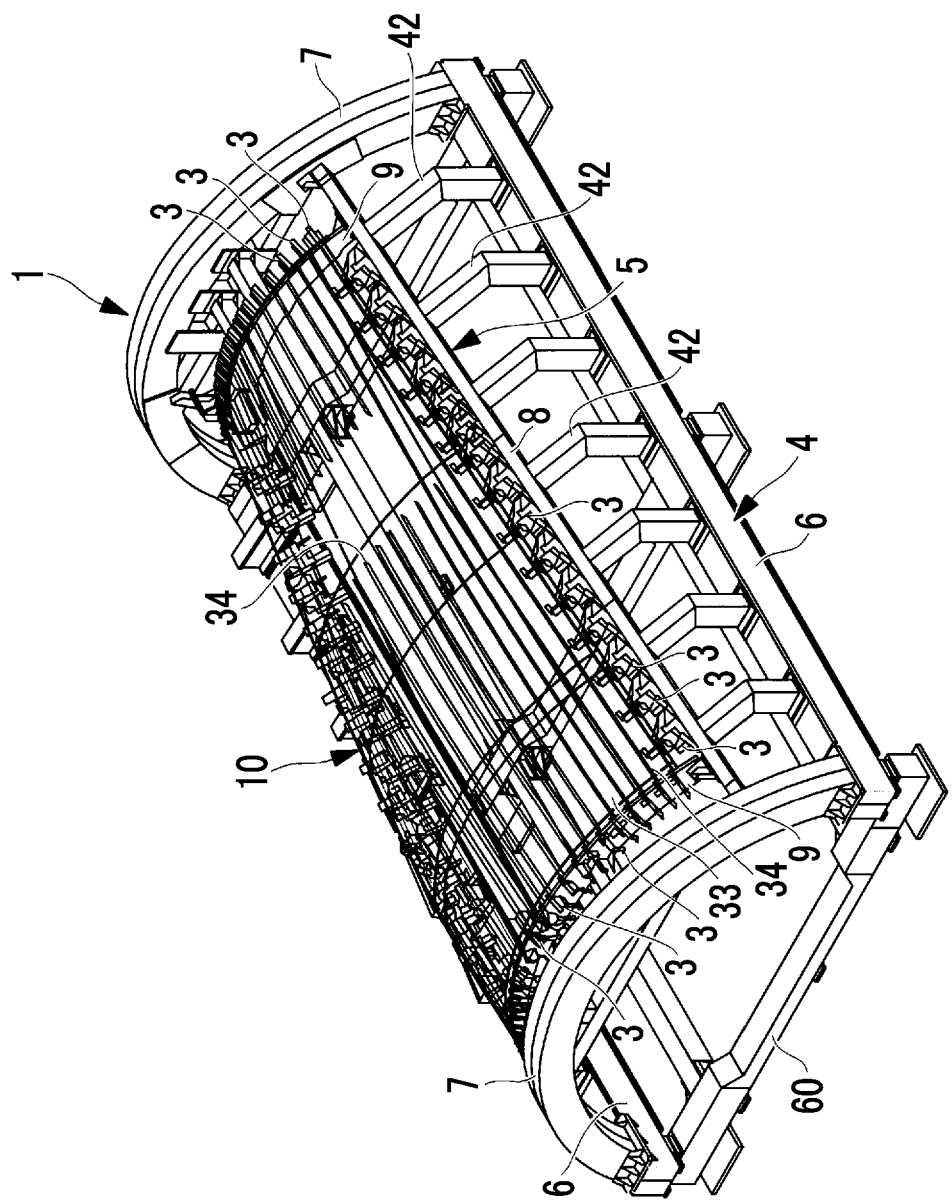
FIG. 4 is a perspective view showing a holding jig according to the embodiment of the present invention, a body panel placed on the holding jig, and a fixing base on which the holding jig is placed.

As shown in FIG. 4, the body panel 10 of an aircraft is configured by a combination of a plate-shaped skin 33 having a curved surface, an elongated stringer 34 which is provided on the skin 33 along the axis direction (the longitudinal direction) of the body, a frame (not shown) which is provided along the circumferential direction of the body, and the like. The body panel 10 is made of, for example, aluminum or an aluminum alloy, and as an example of the size thereof, a length in the longitudinal direction is 10 m, a chord length is 6 m, and a plate thickness is in a range of 2 mm to 5 mm.

In the process of holding the body panel 10 by the holding jig 1 according to this embodiment, the body panel has a shape obtained by dividing a substantially cylindrical body portion of an aircraft in the axis direction and the circumferential direction. Therefore, in the body panel 10, a cross section in the direction perpendicular to the axis direction has an arc shape. In the body panel 10, the two facing sides parallel or oblique to the axis direction are straight lines and are located at the lower ends of the body panel 10 when the body panel 10 is held by the holding jig 1. Further, in the body panel 10, the two facing sides, each of which falls within a plane perpendicular to the axis direction, have arc shapes and are located at the side ends of the body panel 10 when the body panel 10 is held by the holding jig 1.

In a case where a portion in the axis direction of the body of the aircraft, which is manufactured, has a single curved surface having the same curvature along the axis direction, all the plurality of body panels 10 also have the same curvature along the axis direction. On the other hand, in a case where the body panel 10 which is manufactured has a double-curved surface having curvature which varies along the axis direction, an extending direction of a lower end support material 8 is oblique with respect to an extending direction of the horizontal material 6.

The holding jig 1 has a transportable configuration and is transported from one end side to the other end side with it placed on the transport device (not shown) having a chain conveyor, a belt conveyor, or the like, for example. In the transport device, a chain, a belt, or the like is provided to be wound parallel to the horizontal material 6 of the holding jig 1, and the chain, the belt, or the like is rotated by the drive of a motor. FIG. 4 shows a state where the holding jig 1 is fixed to a fixing base 60.

In the holding jig 1, a plurality of grip parts 3 are supported by a support material 5 and are integrated with each other with the relative positions fixed, and the holding jig 1 has a shape in which the bottom portions of the two horizontal materials 6 fall within the same plane. In this way, the holding jig 1 can be transported by the transport device.

Figure 5:
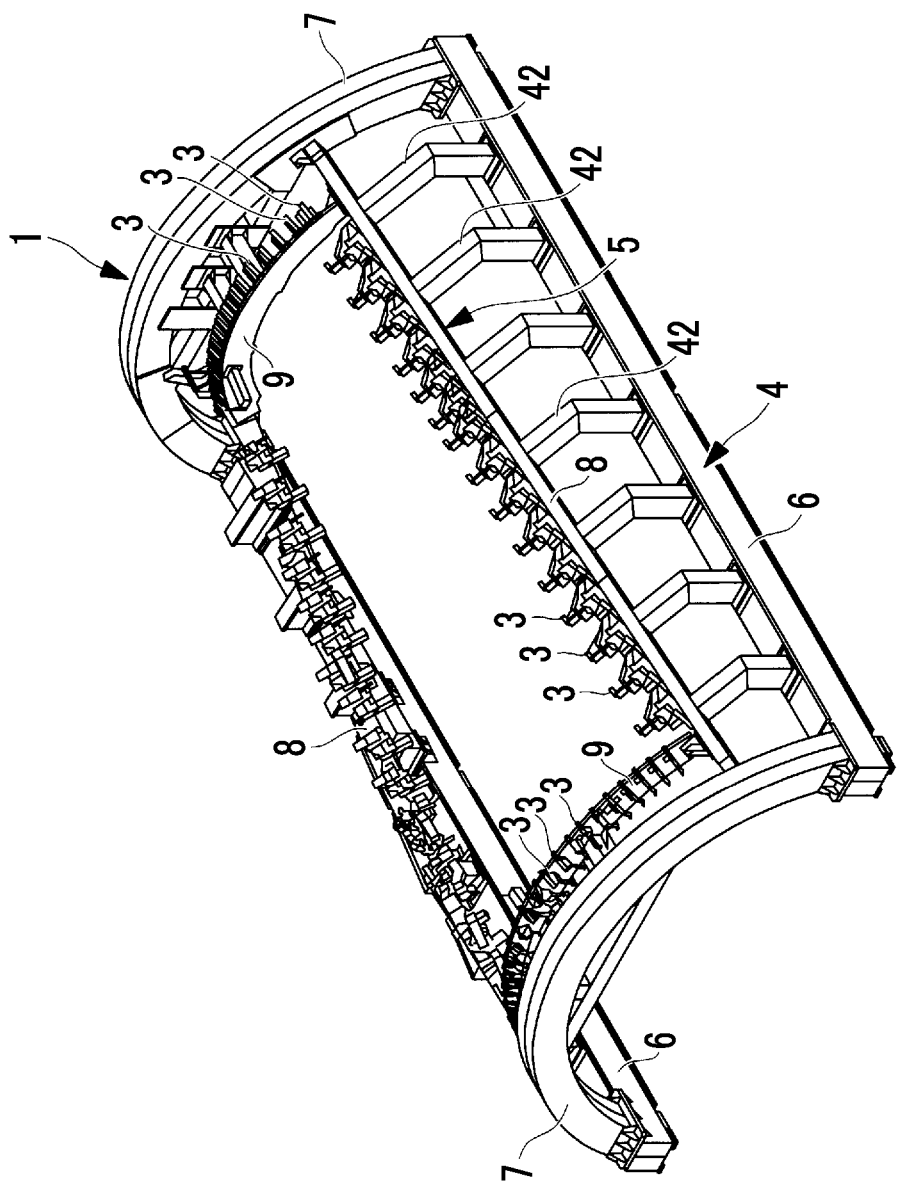
FIG. 5 is a perspective view showing the holding jig according to the embodiment of the present invention.

As shown in FIGS. 4 and 5, the holding jig 1 according to this embodiment is provided with a frame material 4, the support material 5, the grip part 3, and the like. When the body panel 10 is held by the holding jig 1, the body panel 10 is held so as to be convex upward.

The frame material 4 is composed of two straight horizontal materials 6 extending in one direction, two arch materials 7 installed between the two horizontal materials 6 and formed in an arch shape, and the like. The horizontal materials 6 and the arch materials 7 of the frame material 4 support the support material 5 (described later).

The horizontal materials 6 are disposed, for example, parallel to the axis direction of the body panel 10 along the axis direction of the body panel 10 which is installed on the holding jig 1. The lower ends of the arch materials 7 are joined to one end portions and the other end portions of the horizontal materials 6. In this way, the holding jig 1 has a substantially saddle shape due to the two horizontal materials 6 and the two arch materials 7.

In the holding jig 1 of this embodiment, a beam material is not provided which joins one end portions or the other end portions of the two horizontal materials 6 together and extends in the direction perpendicular to the horizontal material 6. In this way, in a case where the body panel 10 is provided on the holding jig 1, a work space which can pass along the axis direction without being obstructed by the beam material can be secured at the lower portion of the body panel 10.

The length of the horizontal material 6 is longer than the length in the axis direction of the body panel 10 which is manufactured by rivet fastening, and the disposition interval between the two horizontal materials is longer than the chord length of the body panel 10 which is manufactured by rivet fastening.

The arch material 7 is the frame material 4 having a curved shape and is disposed within a plane in the direction perpendicular to the axis direction of the body panel 10 which is installed on the holding jig 1. The arch materials 7 are provided one by one on one end side and the other end side of the horizontal material 6 and are joined to the two horizontal materials 6. In this way, the frame material 4 has a configuration in which the horizontal materials 6 and the arch materials 7 are integrated with each other. The curved shape, for example the curvature, of the arch material 7 is provided substantially corresponding to the curvature of the body panel 10 which is manufactured.

The support material 5 is composed of the two straight lower end support materials 8 extending in the axis direction, two side end support materials 9 which are installed between the two lower end support materials 8 and each formed in an arch shape, and the like.

The lower end support materials 8 support the lower ends of the body panel 10 through the grip parts 3. The lower end support material 8 is located above the horizontal material 6 of the frame material 4 and disposed, for example, so as to extend in a direction parallel or oblique to the axis direction of the body panel 10, along the axis direction of the body panel 10 which is installed on the holding jig 1. The lower end support material 8 is disposed corresponding to each side of the two facing sides of the body panel 10 which is installed on the holding jig 1. For example, the lower end support materials 8 are disposed so as to extend along the end portions of the two straight facing ends of the body panel 10.

For example, in a case where the body panel 10 which is manufactured has a single curved surface having the same curvature along the axis direction, when the body panel 10 has been installed on the holding jig 1 such that the axis of the body panel 10 is parallel to the horizontal plane, the extending directions of the lower end support material 8 and the horizontal material 6 are parallel to each other. On the other hand, in a case where the body panel 10 which is manufactured has a double-curved surface having curvature which varies along the axis direction, when the body panel 10 has been installed on the holding jig 1 such that the axis of the body panel 10 is parallel to the horizontal plane, the extending direction of the lower end support material 8 is oblique with respect to the extending direction of the horizontal material 6.

Further, in a case where the body panel 10 which is manufactured has a double-curved surface, the body panel 10 may be installed on the holding jig 1 such that the axis of the body panel 10 is oblique with respect to the horizontal plane and the uppermost portion of the body panel 10 on the holding jig 1 is substantially parallel to the horizontal plane along the axis direction. That is, the body panel 10 is installed on the holding jig 1 such that the center on the smaller radius side of the cross section of the body panel 10 is higher than the center on the larger radius side. In this way, the distance from the gate type automatic riveting machine 22 to the body panel 10 becomes substantially equal in the axis direction of the body panel 10.

A case where the two arch materials 7 have the same radius has been exemplified. However, the present invention is not limited to this example, and the radii of the two arch materials 7 may be different from each other.

The lower end support material 8 is supported by the horizontal material 6 through an auxiliary material 42 provided between the lower end support material 8 and the horizontal material 6, for example. The auxiliary material 42 is a member having one end portion which is connected to the horizontal material 6 and the other end portion which is connected to the lower end support material 8, and a plurality of auxiliary materials 42 are disposed along the longitudinal directions of the horizontal material 6 and the lower end support material 8.

The plurality of grip parts 3 are disposed at intervals on the lower end support material 8. The length of the lower end support material 8 is longer than the length in the axis direction of the body panel 10 which is manufactured, and the disposition interval between the two lower end support materials 8 is longer than the chord length of the body panel 10 which is manufactured. Further, the lower end support material 8 is located below the body panel 10 which is held, such that the grip parts 3 support the lower end portion of the body panel 10 from below.

Lower ends of the side end support materials 9 are provided to be joined to one end portions and the other end portions in the longitudinal direction of the lower end support materials 8.

The side end support material 9 supports the side end of the body panel 10 through the grip parts 3. The side end support material 9 is a member having a curved shape and is disposed within a plane in the direction perpendicular to the axis direction of the body panel 10 which is installed on the holding jig 1. The side end support material 9 is disposed corresponding to each side of the two facing sides of the body panel 10 which is installed on the holding jig 1.

The side end support materials 9 are provided one by one on one end side and the other end side in the longitudinal direction of the lower end support material 8 and joined to the two lower end support materials 8. In this way, the support material 5 has a configuration in which the lower end support material 8 and the side end support material 9 are integrated with each other. The curved shape, for example, the curvature, of the side end support material 9 is provided corresponding to the curvature of the body panel 10 which is manufactured. The side end support material 9 may be provided with a plurality of grip parts 3 each having the same configuration as the grip part 3 described above, such that the grip parts 3 grip and support the side end of the body panel 10.

At this time, the plurality of grip parts 3 which are provided at the side end support material 9 are provided at intervals at positions corresponding to the curvature of the body panel 10 which is manufactured. Therefore, the plurality of grip parts 3 grip the body panel 10, whereby the body panel 10 gripped by the grip parts 3 is held so as to have the curvature of the body panel 10 which is manufactured.

For example, in a case where the body panel 10 which is manufactured has a single curved surface having the same curvature along the axis direction, the curvature connecting the plurality of grip parts 3 in the side end support material 9 on one end side and the curvature connecting the plurality of grip parts 3 in the side end support material 9 on the other end side are the same. On the other hand, in a case where the body panel 10 which is manufactured has a double-curved surface having curvature which varies along a uniaxial direction, the curvature connecting the plurality of grip parts 3 in the side end support material 9 on one end side is larger than the curvature connecting the plurality of grip parts 3 in the side end support material 9 on the other end side.

As described above, since the holding jig 1 has the plurality of grip parts 3 and the plurality of grip parts 3 grip only the peripheral edge portions of the body panel 10, it is possible to omit a structural member for supporting the center portion of the body panel 10 in the structure of the holding jig 1 while appropriately maintaining the shape of the peripheral edge portion requiring accuracy in assembly, it is possible to reduce the weight of the holding jig 1. In this way, it is possible to reduce the power associated with the movement of the holding jig 1. Further, the structural member for supporting the central portion of the body panel 10 in the structure of the holding jig 1 is omitted, whereby it is possible to reduce the interference between the automatic riveting machine and the holding jig 1, and thus it is possible to expand the range in which the automatic riveting machine can be applied.

Further, since the body panel 10 having an upwardly convexly curved shape is gripped and supported at the lower peripheral edge portions, the body panel 10 having low rigidity can be stably held. In this way, it is possible to omit the structural member for supporting the central portion of the body panel 10 in the structure of the holding jig 1 while appropriately maintaining the shape of the peripheral edge portion requiring accuracy in assembly.

In this embodiment, the frame material 4 (or one of the arch materials 7 of the frame material 4) is shared by the plurality of holding jigs 1 which move along the same production line, whereby the outer shape of the holding jig 1 is made to be common. Further, the support material 5, the lower end support material 8, and the side end support material 9 which are installed on the holding jig 1 are installed so as to correspond to the shape of the body panel 10 further on the inner side than the outer shape made to be common. In this way, the body panel 10 is installed on the holding jig 1 so as not to affect the outer shape of the holding jig 1.

Since the outer shape of the holding jig 1 is made to be common and the support material 5, the lower end support material 8, and the side end support material 9 are installed according to the shape of the body panel 10, according to the holding jig 1 of this embodiment, various kinds of body panels 10 can be transported on the same line. Further, merely by making the installation positions of the support material 5, the lower end support material 8, and the side end support material 9 different, it is possible to cope with a change in the shape of the body panel 10 according to a change in the specification of the aircraft.

Next, the initial shape retaining jig 51 which is used in combination with the holding jig 1 described above will be described.

When the plurality of split panels 31 are placed on the holding jig 1 by the split panel mounting robot 21 in the split panel mounting space 11, the initial shape retaining jig 51 is used. That is, the initial shape retaining jig 51 is placed on the fixing base 60 in the split panel mounting space 11, and the initial shape retaining jig 51 which is installed below the holding jig 1 supports the body panel 10 from the lower surface side and retains the shape of the body panel 10.

The split panel 31 is a member before the body panel 10 is fastened by rivets, and is a member which is one among a plurality of parts into which the body panel 10 is divided. The split panel 31 is, for example, a member which is long in the direction parallel to the axis direction and is one among a plurality of parts into which the body panel 10 is divided in the circumferential direction. The split panel 31 is one among four panels into which the body panel 10 is divided in the circumferential direction, for example.

Figure 6:
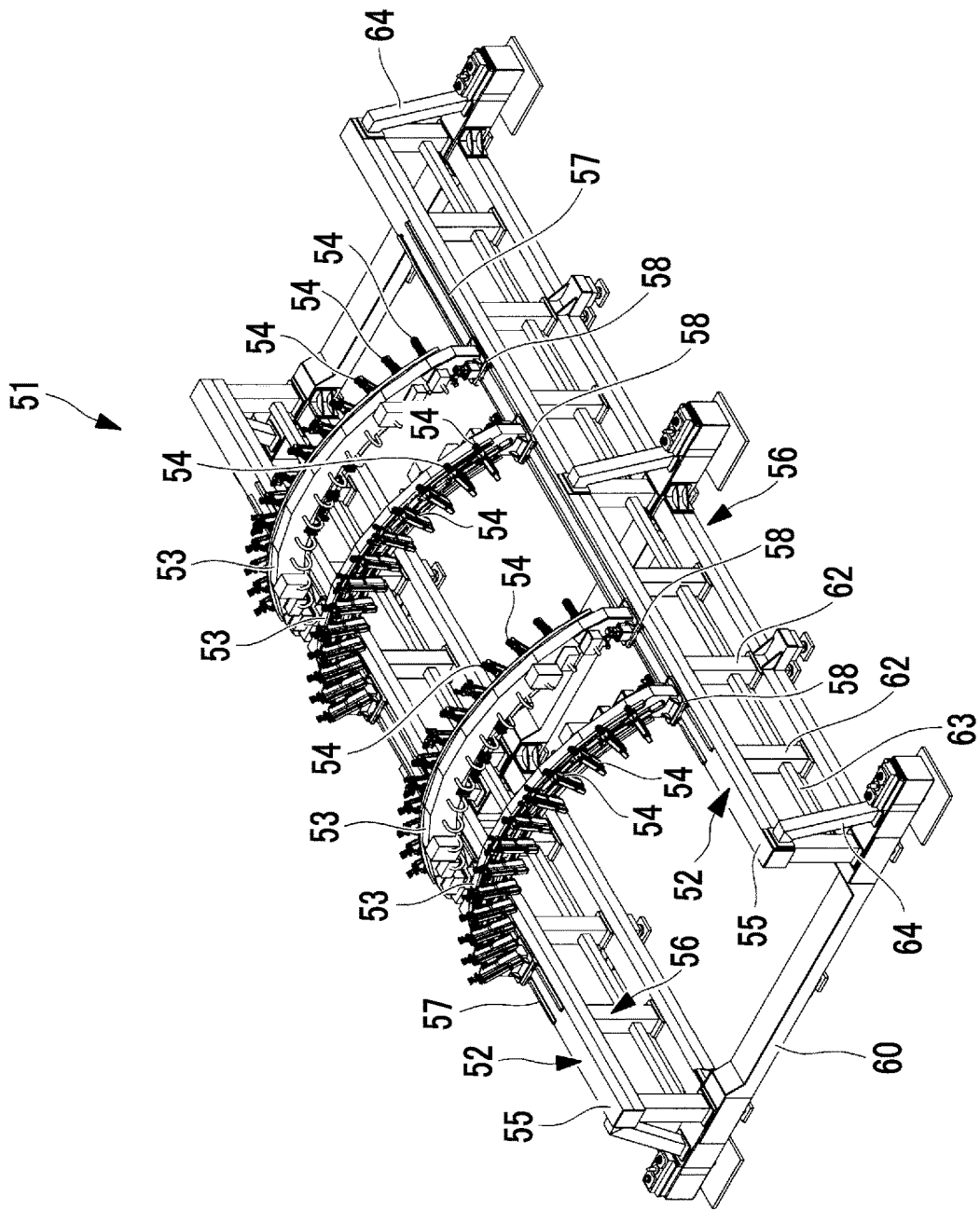
FIG. 6 is a perspective view showing an initial shape retaining jig according to the embodiment of the present invention.

As shown in FIG. 6, the initial shape retaining jig 51 according to this embodiment includes a pedestal part 52, a support material 53, a shape retaining part 54, and the like.

The pedestal part 52 has two horizontal materials 55 which are disposed, for example, parallel to the axis direction of the body panel 10 along the axis direction of the body panel 10 which is installed on the holding jig 1, a structural body 56 which supports each of the horizontal materials 55, and the like.

The horizontal material 55 of the pedestal part 52 is an elongated member having an upper surface horizontal with respect to an installation surface. The two horizontal materials 55 are parallel to each other. The horizontal material 55 is supported by the structural body 56. A plurality of support materials 53 are installed on the upper surface of the horizontal material 55 of the pedestal part 52. Further, a rail 57 which allows the support material 53 to move in the axis direction, that is, along the longitudinal direction of the horizontal material 55 is provided on the upper surface of the horizontal material 55. A traveling part 58 traveling on the rail 57 is provided on the lower surface of the support material 53.

The structural body 56 of the pedestal part 52 has a plurality of pillar materials 62 provided to be erect in the vertical direction from the upper surface of the fixing base 60 and disposed at intervals along the axis direction, a beam material 63 joining the plurality of pillar materials 62, a diagonal material 64 which is disposed in an oblique direction, and the like. The structural body 56 is not limited to the example shown in the drawing and may have any other configuration as long as it can support the weight of the support material 53 which is placed on the pedestal part 52 or some of the weight of the body panel 10 which is transmitted through the support material 53.

The lower end of the support material 53 is placed on a track on the upper surface of the horizontal material 55. In this way, the initial shape retaining jig 51 has a substantially saddle shape due to the two horizontal materials 55 and the plurality of support materials 53.

In the initial shape retaining jig 51 of this embodiment, a beam material is not provided which joins one end portions or the other end portions of the two horizontal materials 55 together and extends in the direction perpendicular to the horizontal material 55, similar to the holding jig 1. In this way, in a case where the body panel 10 is provided on the holding jig 1, a work space which can pass along the axis direction without being obstructed by the beam material can be secured at the lower portion of the body panel 10.

The length of the horizontal material 55 is longer than the length in the axis direction of the body panel 10 which is manufactured by rivet fastening, and the disposition interval between the two horizontal materials 55 is longer than the chord length of the body panel 10 which is manufactured by rivet fastening.

The support material 53 is a member having an arc shape and is disposed within a plane in the direction perpendicular to the axis direction of the body panel 10 which is installed on the holding jig 1. With respect to the support material 53, in the example shown in FIG. 6, four support materials 53 are provided on the upper surface of the horizontal material 55 with respect to one body panel 10. The curved shape, for example, the curvature, of the support material 53 is provided substantially corresponding to the curvature of the body panel 10 which is manufactured.

The interval of the plurality of support materials 53 is determined according to the size, the shape, or the like of the body panel 10 which is held.

A plurality of shape retaining parts 54 are provided at intervals along the circumferential direction at the support material 53. The shape retaining parts 54 support the body panel 10 from below. The plurality of shape retaining parts 54 support the body panel 10, whereby during the rivet fastening work of overlapping the split panels 31, the body panel 10 is held so as to have a shape to be formed at the time of completion. The shape retaining part 54 has a configuration in which it comes into contact with the lower surface of the body panel 10 and the position of the upper surface of the shape retaining part 54 supporting the body panel 10 can be adjusted.

As described above, the holding jig 1 supports the body panel 10 at the end portions of the body panel 10. That is, in the body panel 10 having the skin 33, the end portions of the two facing sides (for example, the two facing sides parallel to the axis direction) of the body panel 10 are gripped by the plurality of grip parts 3. At this time, the plurality of grip parts 3 are integrally supported through the support material 5 which is provided corresponding to the body panel 10.

Further, the body panel 10 is held such that the cross section cut in the direction perpendicular to the axis direction has a curved shape and the upper side is convex. The body panel 10 is held, for example, from the lower side of the body panel 10 at the end portions of the two sides of the body panel 10, and therefore, the holding jig 1 can hold the body panel 10 with a simple structure. Further, since the holding jig 1 has a configuration in which it can be transported in a state of holding the body panel 10, and has a shape in which, for example, the frame material 4 and the support material 5 are integrated with each other and the bottom portions of the horizontal materials 6 fall within the same plane, the holding jig 1 can be transported in a state of holding the body panel 10.

The holding jig 1 has a structure of supporting the body panel 10 at the end portions of the body panel 10, whereby it is simplified and reduced in weight, compared to a jig in which a plurality of positioning materials are provided corresponding to a plurality of frames which are installed on the body panel 10, like a jig of the related art. Therefore, the body panel 10 can move together with the holding jig 1 in a state where the body panel 10 is held by the holding jig 1. As a result, it is possible to perform the rivet fastening work by an automatic riveting machine, perform the river fastening work by manual work, or perform the inspection and repair work, with respect to the body panel 10 while the holding jig 1 moves through different work places.

Further, with the use of the initial shape retaining jig 51, even in a case where the rigidity of the body panel 10 is low, when overlapping the end portions of the split panels 31, or the like, the shape accuracy of the body panel 10 can be secured. By using the initial shape retaining jig 51 in combination with the holding jig 1, it is possible to simplify the holding jig 1. Further, with the configuration in which the support material 53 or the shape retaining part 54 is movable, it is possible to deal with the shapes of the plural kinds of body panels 10 and share the initial shape retaining jig 51.

Then, according to the body panel production method of this embodiment, after the plurality of split panels 31 configuring the body panel 10 are fastened to each other at the overlapping portions by rivets, the split panels 31 are moved to a different place and the frame 32 is mounted on the skin or the stringer of the body panel 10 by rivets. In this way, after the shape of the skin of the body panel 10 is determined, the frame 32 is fixed to the skin, and therefore, it is possible to manufacture the body panel 10 with high accuracy, compared to a case where the frame 32 is mounted on the skin or the stringer at the same time while overlapping the end portions of the skins.

Further, since the body panel 10 with high accuracy can be manufactured by using the simple holding jig 1 according to the order described above, it is possible to achieve labor-saving of work due to the fastening using the gate type automatic riveting machine 22 and the automatic riveting machine 25 instead of manual rivet fastening. Further, since the light-weight holding jig 1 is moved, it is possible to reduce the power required for the transport of the holding jig 1.

Further, after the rivet fastening work by the automatic riveting machine, the buffer spaces 13 and 17 are provided. Then, when the holding jig 1 is fixed there, it is possible to move the gate type automatic riveting machine 22 and the automatic riveting machine 25 from the automatic riveting spaces 12 and 16 to the buffer spaces and 17, and it is also possible for the gate type automatic riveting machine 22 and the automatic riveting machine 25 to perform joining by rivets in the buffer spaces 13 and 17. As a result, it is possible to absorb a time difference of work time, which occurs according to the kind of an aircraft panel.

In addition, the track for transport 2 is provided, so that the holding jig 1 moves in one direction along the track for transport 2, and in each work space, the holding jig 1 is fixed and the rivet fastening work or the like is performed on the body panel 10. That is, while the work is being performed, the body panel 10 is fixed, and the body panel 10 is moved only when it is transported between the work spaces. Since it is not necessary to change the moving method of the holding jig 1 or the process procedure according to the kind of the body panel 10, it is possible to manufacture all kinds of the body panels 10 on the same production line.

REFERENCE SIGNS LIST

1: holding jig
2: track for transport
3: grip part
4: frame material
5: support material
6: horizontal material
7: arch material
8: lower end support material
9: side end support material
10: body panel
11: split panel mounting space
12: automatic riveting space
13: buffer space
14: manual riveting space
15: frame mounting space
16: automatic riveting space
17: buffer space
21: split panel mounting robot
22: gate type automatic riveting machine
24: frame mounting robot
25: automatic riveting machine
31: split panel
51: initial shape retaining jig

The invention claimed is:

1. An aircraft panel production method comprising:
 a step in which a holding jig holds an aircraft panel having a plurality of plate-like members each having a curved cross-sectional shape such that a cross section of the aircraft panel has an upwardly convexly curved shape;
 a step of overlapping the plurality of plate-like members of the aircraft panel held by the holding jig and joining overlapping portions together by rivets, in a first processing area;
 a step of moving translationally, in a horizontal direction along a track, the holding jig holding the aircraft panel with the plurality of plate-like members joined together, from the first processing area to a second processing area; and
 a step of joining, by rivets, a curved member which follows the curved shape of the aircraft panel to the plurality of plate-like members of the aircraft panel held by the holding jig which has been moved, in the second processing area,
 wherein in a step of fixing onto the holding jig, only peripheral edge portions in a longitudinal direction of the plurality of plate-like members are gripped and fixed, and
 the holding jig moves between the first processing area and the second processing area while maintaining a state of gripping the aircraft panel.

2. The aircraft panel production method according to claim 1,
 wherein a state where the aircraft panel is held by the holding jig is maintained through the step of joining the overlapping portions of the plurality of plate-like members together by rivets, the step of moving the holding jig with the aircraft panel held thereon, and the step of joining the curved member by rivets.

3. The aircraft panel production method according to claim 1,
 wherein in the step in which the holding jig holds the aircraft panel, the holding jig has a plurality of grip parts and the plurality of grip parts grip only peripheral edge portions of the plurality of plate-like members to hold the aircraft panel.

4. The aircraft panel production method according to claim 1,
 wherein the holding jig has a plurality of grip parts which grip end portions of two facing sides of the aircraft panel, and
 the plurality of grip parts grip peripheral edge portions of the plurality of plate-like members to hold the aircraft panel.

5. The aircraft panel production method according to claim 4,
 wherein the two facing sides are two sides extending in a direction perpendicular to a cross section having an upwardly convexly curved shape of the aircraft panel, and become lower peripheral edge portions of the aircraft panel in a state of being held by the holding jig.

6. The aircraft panel production method according to claim 1,
 wherein in at least one of the step of joining the overlapping portions of the plurality of plate-like members together by rivets and the step of joining the curved member by rivets, the joining by the rivets is performed by an automatic riveting machine.

7. The aircraft panel production method according to claim 6, further comprising:
a step of fixing the holding jig in a buffer space, after at least one of the step of joining the overlapping portions of the plurality of plate-like members together by rivets and the step of joining the curved member by rivets,
wherein in the buffer space, the automatic riveting machine performs the joining by the rivets.

8. An aircraft panel production method comprising:
a step in which a holding jig holds an aircraft panel having a plurality of plate-like members each having a curved cross-sectional shape such that a cross section of the aircraft panel has an upwardly convexly curved shape;
a step of overlapping the plurality of plate-like members of the aircraft panel held by the holding jig and joining overlapping portions together by rivets;
a step of moving translationally, in a horizontal direction along a track, the holding jig holding the aircraft panel with the plurality of plate-like members joined together; and
a step of joining, by rivets, a curved member which follows the curved shape of the aircraft panel to the plurality of plate-like members of the aircraft panel held by the holding jig which has been moved,
wherein in at least one of the step of joining the overlapping portions of the plurality of plate-like members together by rivets and the step of joining the curved member by rivets, the joining by the rivets is performed by an automatic riveting machine,
the method further includes a step of fixing the holding jig in a buffer space, after at least one of the step of joining the overlapping portions of the plurality of plate-like members together by rivets and the step of joining the curved member by rivets, and
in the buffer space, the automatic riveting machine performs the joining by the rivets.

9. The aircraft panel production method according to claim 8, wherein the holding jig moves in one direction along the track for transport, and in the step of joining the overlapping portions of the plurality of plate-like members together by rivets and the step of joining the curved member by rivets, the holding jig is fixed in each processing space.

10. An aircraft panel production method comprising:
a step in which a holding jig holds an aircraft panel having a plurality of plate-like members each having a curved cross-sectional shape such that a cross section of the aircraft panel has an upwardly convexly curved shape;
a step of overlapping the plurality of plate-like members of the aircraft panel held by the holding jig and joining overlapping portions together by rivets;
a step of moving the holding jig holding the aircraft panel with the plurality of plate-like members joined together; and
a step of joining, by rivets, a curved member which follows the curved shape of the aircraft panel to the plurality of plate-like members of the aircraft panel held by the holding jig which has been moved,
wherein the holding jig moves in one direction along a track for transport, and in the step of joining the overlapping portions of the plurality of plate-like members together by rivets and the step of joining the curved member by rivets, the holding jig is fixed in each processing space.

11. The aircraft panel production method according to claim 10,
wherein the holding jig includes:
a plurality of grip parts which grip end portions of two facing sides of the aircraft panel, and
a support material provided corresponding to the aircraft panel which is gripped by the plurality of grip parts, and integrally supporting the plurality of grip parts,
the support material has a first frame material which is provided corresponding to each side of the two facing sides of the aircraft panel along a uniaxial direction,
the plurality of grip parts supported by the first frame material hold the aircraft panel such that a cross section cut in a direction perpendicular to the uniaxial direction has an upwardly convexly curved shape, while gripping the aircraft panel at end portions of the two facing sides of the aircraft panel along the uniaxial direction, and
the holding jig has a configuration capable of being transported in a state of holding the aircraft panel.

* * * * *